US008990562B2

(12) United States Patent
Jirka et al.

(10) Patent No.: US 8,990,562 B2
(45) Date of Patent: Mar. 24, 2015

(54) SECURE DEPLOYMENT OF PROVABLE IDENTITY FOR DYNAMIC APPLICATION ENVIRONMENTS

(75) Inventors: Ian Jirka, Issaquah, WA (US); Kahren Tevosyan, Kirkland, WA (US); Corey Sanders, Seattle, WA (US); George M. Moore, Issaquah, WA (US); Mohit Srivastava, Seattle, WA (US); Mark Eugene Russinovich, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 12/901,445

(22) Filed: Oct. 8, 2010

(65) Prior Publication Data
US 2012/0089833 A1    Apr. 12, 2012

(51) Int. Cl.
*H04L 9/32* (2006.01)
*G06F 21/00* (2013.01)
*G06F 7/04* (2006.01)
*G06F 21/33* (2013.01)
*H04L 29/06* (2006.01)
*G06F 21/57* (2013.01)

(52) U.S. Cl.
CPC .............. *H04L 9/3228* (2013.01); *G06F 21/33* (2013.01); *H04L 63/0823* (2013.01); *G06F 21/57* (2013.01)
USPC ................ 713/168; 713/170; 713/182; 726/4

(58) Field of Classification Search
USPC ........................ 713/193, 168, 170, 182; 726/4
See application file for complete search history.

(56) References Cited

U.S. PATENT DOCUMENTS

2007/0174429 A1    7/2007  Mazzaferri et al.
2008/0104393 A1    5/2008  Glasser et al.
2008/0104684 A1    5/2008  Lunde et al.
2008/0228865 A1    9/2008  Cruzada
(Continued)

FOREIGN PATENT DOCUMENTS

CN              101022339 A      8/2007

OTHER PUBLICATIONS

"Authentication using a Security Token Service", CICS Transaction Server for z/OS, Version 3.2, www.publib.boulder.ibm.com/infocenter-cicsts-v3r2-index.jsp?topic=-com.ibm.cics.ts.webservices.doc-wsSecurity-dfhws_auth_sts.html, accessed Jul. 26, 2010, 2 pages.

(Continued)

*Primary Examiner* — Aravind Moorthy
(74) *Attorney, Agent, or Firm* — Timothy Churna; Kate Drakos; Micky Minhas

(57) ABSTRACT

An invention is described for securely deploying a provable identity for virtual machines (VMs) in a dynamic environment. In an embodiment, a fabric controller instructs a VM host to create a VM and sends that VM a secret. The fabric controller sends that same secret (or a second secret, such as the private key of a public/private key pair) to the security token service along with an instruction to make an account for the VM. The VM presents proof that it possesses the secret to the security token service and in return receives a full token. When a client connects to the deployment, it receives the public key from the security token service, which it trusts, and the full token from the VM. It validates the full token with the public key to determine that the VM has the identity that it purports to have.

20 Claims, 9 Drawing Sheets

(56) References Cited

U.S. PATENT DOCUMENTS

| | | | |
|---|---|---|---|
| 2009/0037736 A1* | 2/2009 | Djordjrvic et al. | 713/170 |
| 2009/0228967 A1 | 9/2009 | Gbadegesin et al. | |
| 2009/0300719 A1 | 12/2009 | Ferris | |
| 2010/0042636 A1 | 2/2010 | Lu | |
| 2010/0131654 A1 | 5/2010 | Malakapalli et al. | |
| 2012/0054491 A1* | 3/2012 | Tippett | 713/168 |

OTHER PUBLICATIONS

"Microsoft Azure: Security in the Cloud", www.windowsecurity.com-articles-Microsoft-Azure-Security-Cloud.html, accessed Jul. 26, 2010, 9 pages.

Claeys, "The need for worldwide scalability of applications influences solution architectures in Azure hosted applications", www.geekswithblogs.net/claeyskurt-archive-2009-04-30-131620.aspx, accessed Jul. 26, 2010, 5 pages.

Kommalapati, "Windows Azure Platform for Enterprises", Cloud Computing, www.msdn.microsoft.com-en-us-magazine-ee309870(printer).aspx, accessed Jul. 26, 2010, 17 pages.

Yunis, "A 'cloud-free' security model for cloud computing", www.inderscience.com-offer.php?id=32177, accessed Jul. 26, 2010, 1 page.

PCT/US2011/053010, International Search Report dated Apr. 10, 2012, 8 pages.

"Final Office Action and Search Report Issued in China Patent Application No. 201110310751.X", Mailed Date: Nov. 13, 2013, 16 Pages.

"Second Office Action Issued in China Patent Application No. 201110310751.X", Mailed Date: Jul. 25, 2014, 6 Pages.

"Office Action Issued in Australia Patent Application No. 2011312611", Mailed Date: Apr. 9, 2014, 3 Pages.

* cited by examiner

SECURE DEPLOYMENT OF PROVABLE IDENTITY FOR DYNAMIC APPLICATION ENVIRONMENTS

BACKGROUND

It is common for computers to communicate securely. A computer may have a provable identity that another computer can evaluate to determine that the first computer is the computer that it purports to be (e.g. a particular company's login and authorization server).

It is also common for companies or other entities to deploy server farms made up of virtual machines (VMs). In such server farms, multiple VMs may be configured homogenously and serve resources to clients—such as remote desktops or remote applications. In the course of managing such a server farm, VMs may be destroyed and (re)created. A VM may be destroyed and then recreated for a variety of reasons, such as to prevent drift from a known machine state by recreating it with a known machine state.

In these deployments where VMs are destroyed and created, each VM may have a provable identity. There are many problems with establishing a provable identity for a VM of a deployment, some of which are well known.

SUMMARY

It would therefore be an improvement over the prior art to provide techniques for establishing a provable identity for a VM of a server farm.

One problem that prior techniques have, and which is reduced or eliminated by the present invention is that of the amount of time they require to establish a VM's provable identity. The prior techniques require a relatively large amount of time to carry out. This time cost may not be a major issue in a static environment, where once a machine is set up, it will run for an extended period of time. However in a VM deployment environment, such as a MICROSOFT Azure cloud computing platform, VMs may have a relatively short life, and may be recreated many times. This large number of creation events and the relatively short life of a VM after creation means that this relatively large cost in establishing a provable identity for the VM upon creation will occupy a large amount of the VM's time, and the VM will have less time when it is fully functional.

In an embodiment of the present invention, a controller manages the VMs of a server farm. This controller may be, for example, MICROSOFT's Azure Fabric Controller, which monitors, maintains and provisions VMs in a MICROSOFT Azure cloud computing environment deployment. The deployment also comprises a security token service that is configured to provide clients of the server farm with tokens that the clients can use to confirm the provable identity of a VM in the server farm.

In an embodiment, when the controller deploys a new VM instance, it injects a piece of cryptographic data (a "secret") into the image file that the VM will boot from. Other embodiments may implement other ways of communicating a secret, such as via a separately established security network channel, or where the VM generates the secret and transmits it to the controller over a secure network channel. The controller sends this same cryptographic data (or other cryptographic data corresponding to the cryptographic data, such as where the cryptographic data is a private key, and the other cryptographic data is a public key of an asymmetrical key pair) to the security token service, along with other information that the security token service uses to generate a claim for The new VM. After the controller deploys the new VM instance, the new VM sends the security token service proof that it possesses the secret via a security protocol, and in response receives a full claim token.

When a client connects to the server farm, it will attempt to establish the provable identity of the VM to which it connects. To do so, the client retrieves a public key from the security token service that the security token service uses to sign claims. The client also receives the full claim token from the VM, and uses the public key from the security token service and the full claim token from the VM to determine whether or not the VM's identity is proven.

The example embodiments described herein discuss a situation where a client connects to a VM of a server farm. As described, the client may be thought of as performing a role traditionally considered to be performed by a server—that of authenticating the VM's identity. There are also embodiments where the roles are reversed in a communication, where the VM authenticates the client's identity. In either type of embodiment, the invention for establishing a secure provable identity of a VM of a server farm may be deployed.

In another embodiment, the invention is implemented when the controller redeploys a single application instance into another VM host within the server farm (or even in a different data center, if the application migrates, for instance, due to geographic constraints). Application instances might move around frequently due to the underlying operating system undergoing security patching, or rebooting, or where the underlying hardware experiences a failure. Thus, the invention provides a secure provable identity that is durable across space and time, so even if the application instance is forcibly moved to a different physical server, the secure provable identity remains constant. This is an improvement over prior techniques, where a secure provable identity was bound to the underlying physical hardware.

BRIEF DESCRIPTION OF THE DRAWINGS

The systems, methods, and computer-readable media for establishing a provable identity for a virtual machine of a server farm are further described with reference to the accompanying drawings in which.

DETAILED DESCRIPTION OF ILLUSTRATIVE EMBODIMENTS

Figure 1:
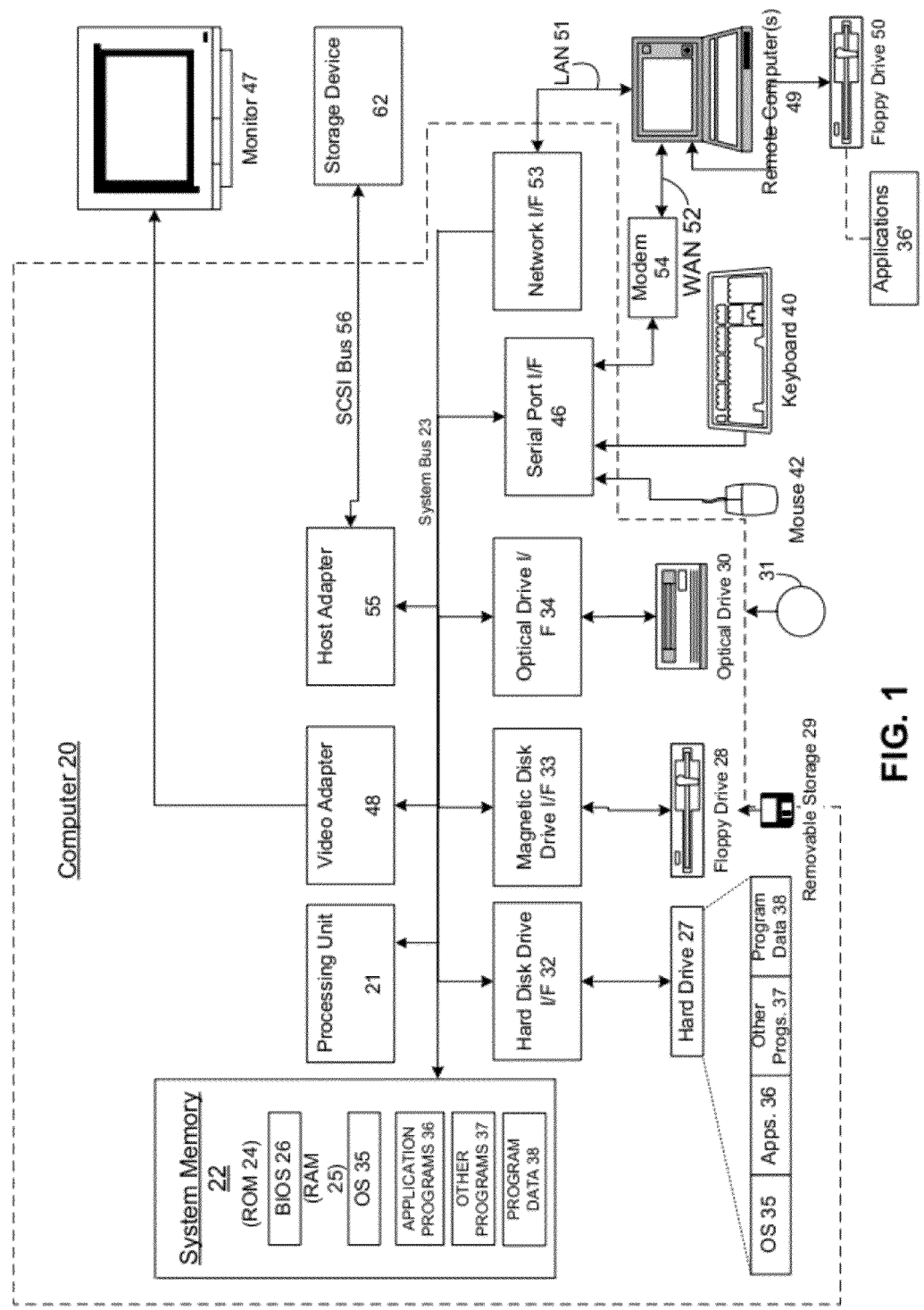
FIG. 1 depicts an example general purpose computing environment in which techniques described herein may be embodied.

Embodiments may execute on one or more computer systems. FIG. 1 and the following discussion are intended to provide a brief general description of a suitable computing environment in which the disclosed subject matter may be implemented.

The term processor used throughout the description can include hardware components such as hardware interrupt controllers, network adaptors, graphics processors, hardware based video/audio codecs, and the firmware used to operate such hardware. The term processor can also include microprocessors, application specific integrated circuits, and/or one or more logical processors, e.g., one or more cores of a multi-core general processing unit configured by instructions read from firmware and/or software. Logical processor(s) can be configured by instructions embodying logic operable to perform function(s) that are loaded from memory, e.g., RAM, ROM, firmware, and/or mass storage.

Referring now to FIG. 1, an exemplary general purpose computing system is depicted. The general purpose computing system can include a conventional computer 20 or the like, including at least one processor or processing unit 21, a system memory 22, and a system bus 23 that communicative couples various system components including the system memory to the processing unit 21 when the system is in an operational state. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as flash memory cards, digital video disks, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37 and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47, display or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
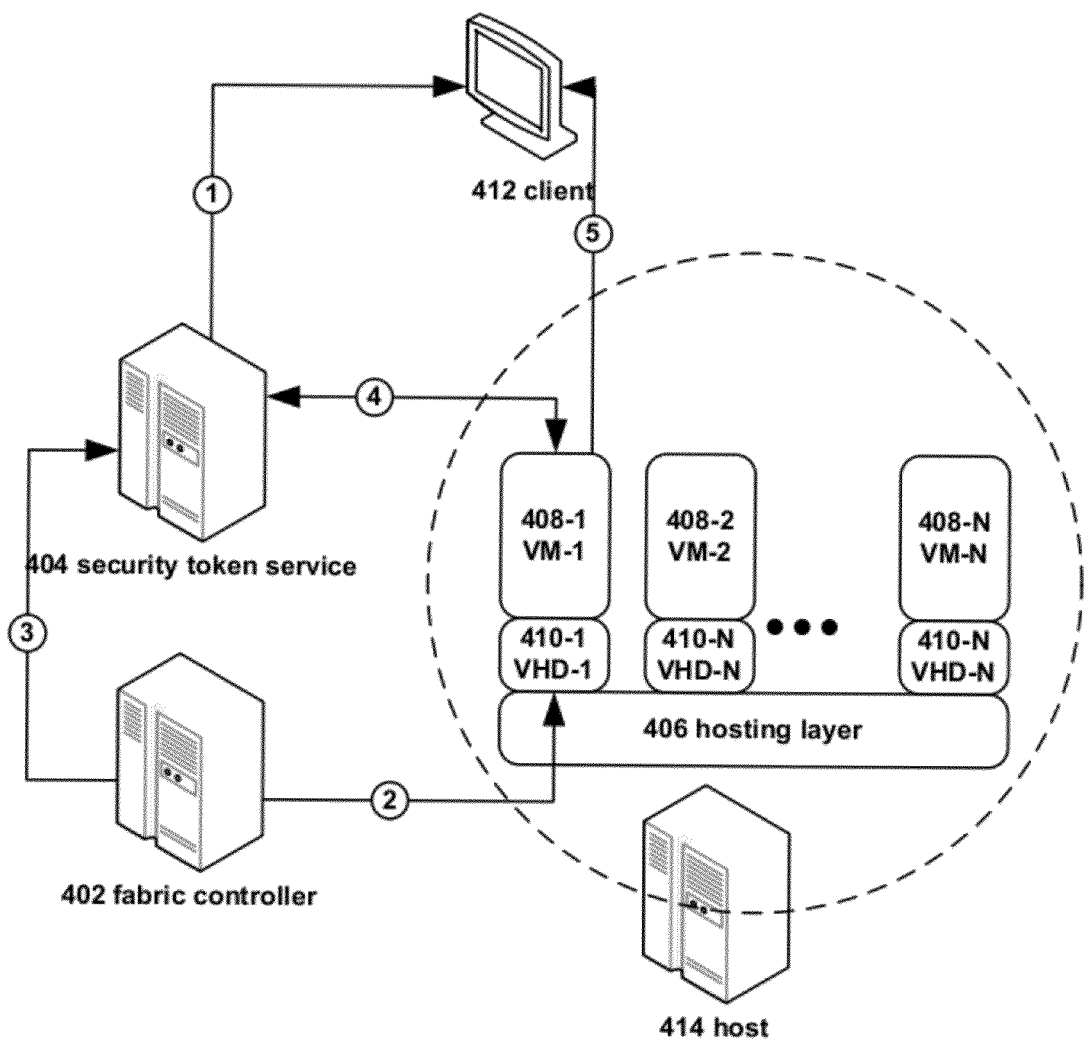
FIG. 5 depicts an example server farm in which an aspect of an embodiment of the invention is implemented.
Figure 6:
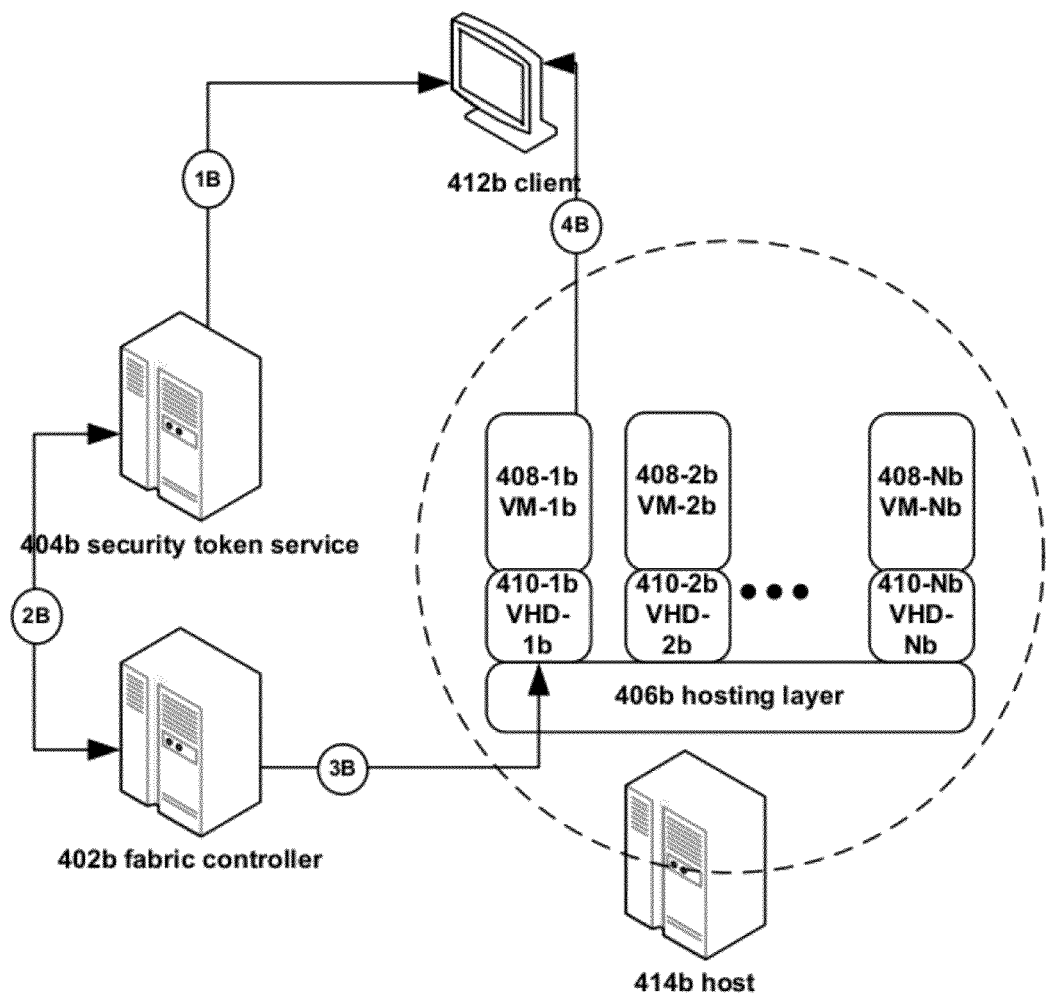
FIG. 6 depicts another example server farm in which an aspect of an embodiment of the invention is implemented.

System memory 22 of computer 20 may comprise instructions that, upon execution by computer 20, cause the computer 20 to implement the invention, such as the operational procedures of FIG. 5 or FIG. 6.

Figure 2:
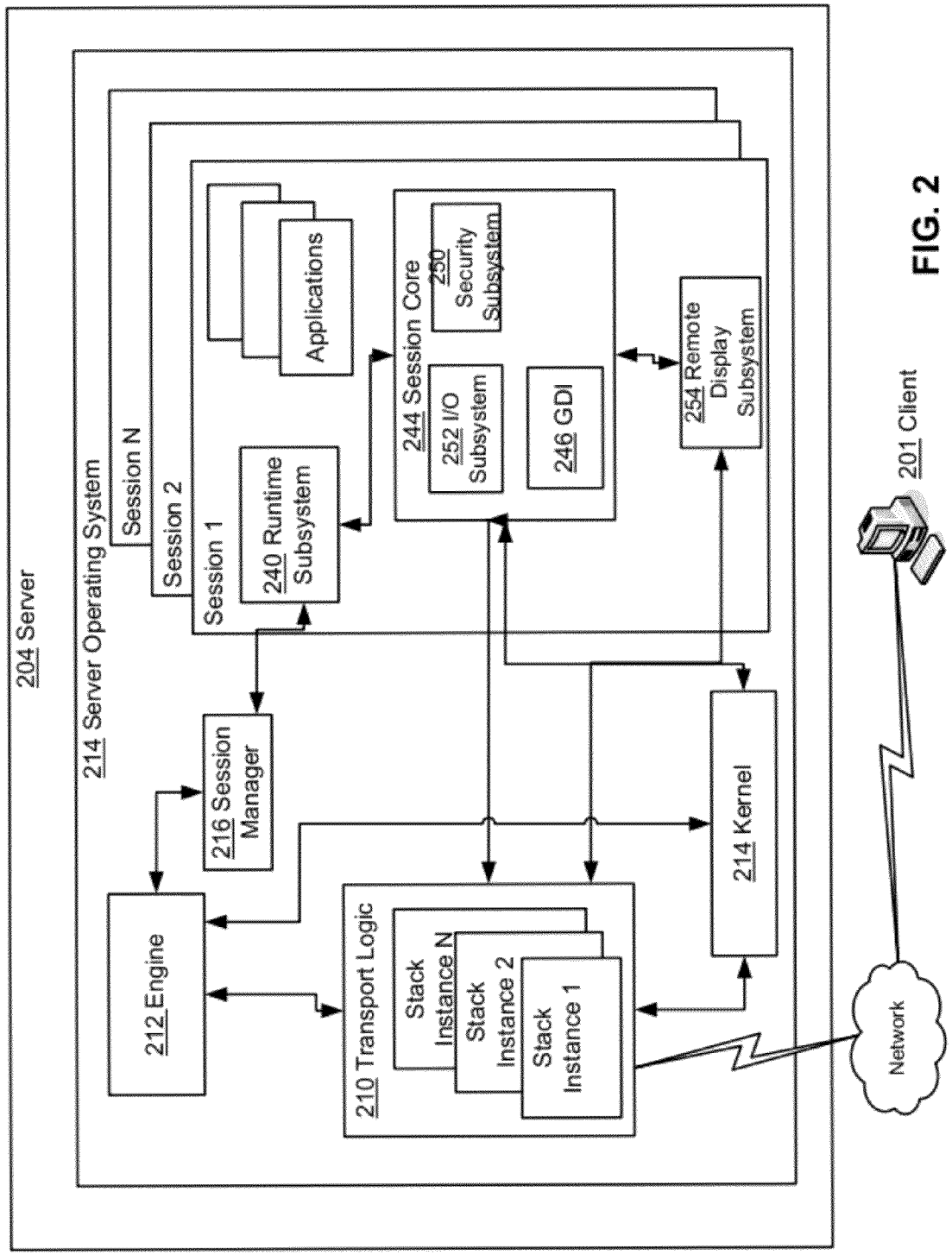
FIG. 2 depicts an example remote presentation session server that may be embodied within a virtual machine with a provable identity.

Generally, FIG. 2 depicts a high level overview of a server environment that can be configured to include aspects of the invention. Server 204 may be effectuated in computer 20 of FIG. 1, where system memory 22 comprises instructions that, upon execution by processing unit 21, cause processing unit 21 to carry out operations that implement the invention. In reference to the figure, depicted is a server 204 that can include circuitry configured to effectuate a remote presentation session server, or in other embodiments the server 204 can include circuitry configured to support remote presentation connections. In the depicted example, the server 204 can be configured to generate one or more sessions for connecting clients such as sessions 1 through N (where N is an integer greater than 1). Briefly, a session in example embodiments of the present invention can generally include an operational environment that is effectuated by a plurality of subsystems (e.g., software code) that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user-by-user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote presentation session capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote presentation subsystem 254 where the commands are formatted for the display driver that is attached to the session. In certain example embodiments one or more physical displays can be attached to the server 204, e.g., in a remote presentation session situation. In these example embodiments the remote presentation subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote presentation subsystem 254 can be configured to include virtual display driver(s) that may not be associated with displays physically attacked to the server 204, e.g., the server 204 could be running headless. The remote presentation subsystem 254 in this embodiment can be configured to receive draw commands for one or more virtual displays and transmit them to the client 201 via a stack instance associated with the session. In an embodiment of the present invention, the remote presentation subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process (sometimes referred to as a log in process) associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
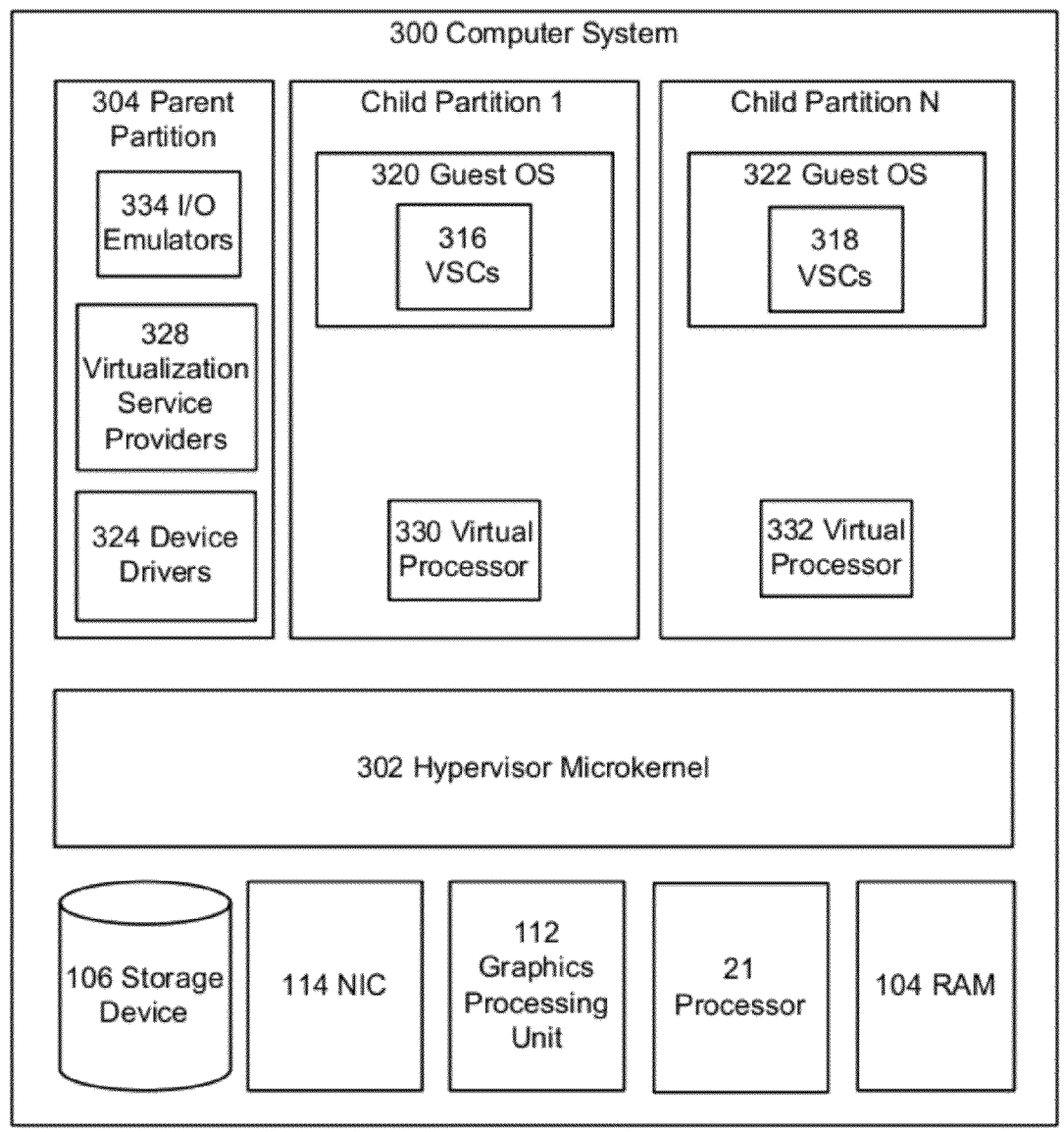
FIG. 3 depicts an example virtual machine host wherein techniques described herein can be implemented.

FIG. 3A depicts an example virtual machine host (sometimes referred to as a VMHost or host) wherein aspects of an embodiment of the invention can be implemented. The VMHost can be implemented on a computer such as computer 20 depicted in FIG. 1, and VMs on the VMHost may execute an operating system that effectuates a remote presentation session server, such as server operating system 214 of FIG. 2.

Hypervisor microkernel 302 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. In an embodiment, the GPAs and SPAs can be arranged into memory blocks, i.e., one or more pages of memory. When a guest writes to a block using its page table, the data is actually stored in a block with a different system address according to the system wide page table used by hypervisor.

In the depicted example, parent partition component 304, which can also be also thought of as similar to "domain 0" in some hypervisor implementations, can interact with hypervisor microkernel 302 to provide a virtualization layer. Parent partition 304 in this operational environment can be configured to provide resources to guest operating systems executing in the child partitions 1-N by using virtualization service providers 328 (VSPs) that are sometimes referred to as "back-end drivers." Broadly, VSPs 328 can be used to multiplex the interfaces to the hardware resources by way of virtualization service clients (VSCs) (sometimes referred to as "front-end drivers") and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

Emulators 334 (e.g., virtualized integrated drive electronics device (IDE devices), virtualized video adaptors, virtualized NICs, etc.) can be configured to run within the parent partition 304 and are attached to resources available to guest operating systems 320 and 322. For example, when a guest OS touches a register of a virtual device or memory mapped to the virtual device 302, microkernel hypervisor can intercept the request and pass the values the guest attempted to write to an associated emulator.

Each child partition can include one or more virtual processors (330 and 332) that guest operating systems (320 and 322) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processors execute hypervisor instructions. The combination of virtual processors and memory in a partition can be considered a virtual machine.

Guest operating systems can include any operating system such as, for example, a MICROSOFT WINDOWS operating system. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 4:
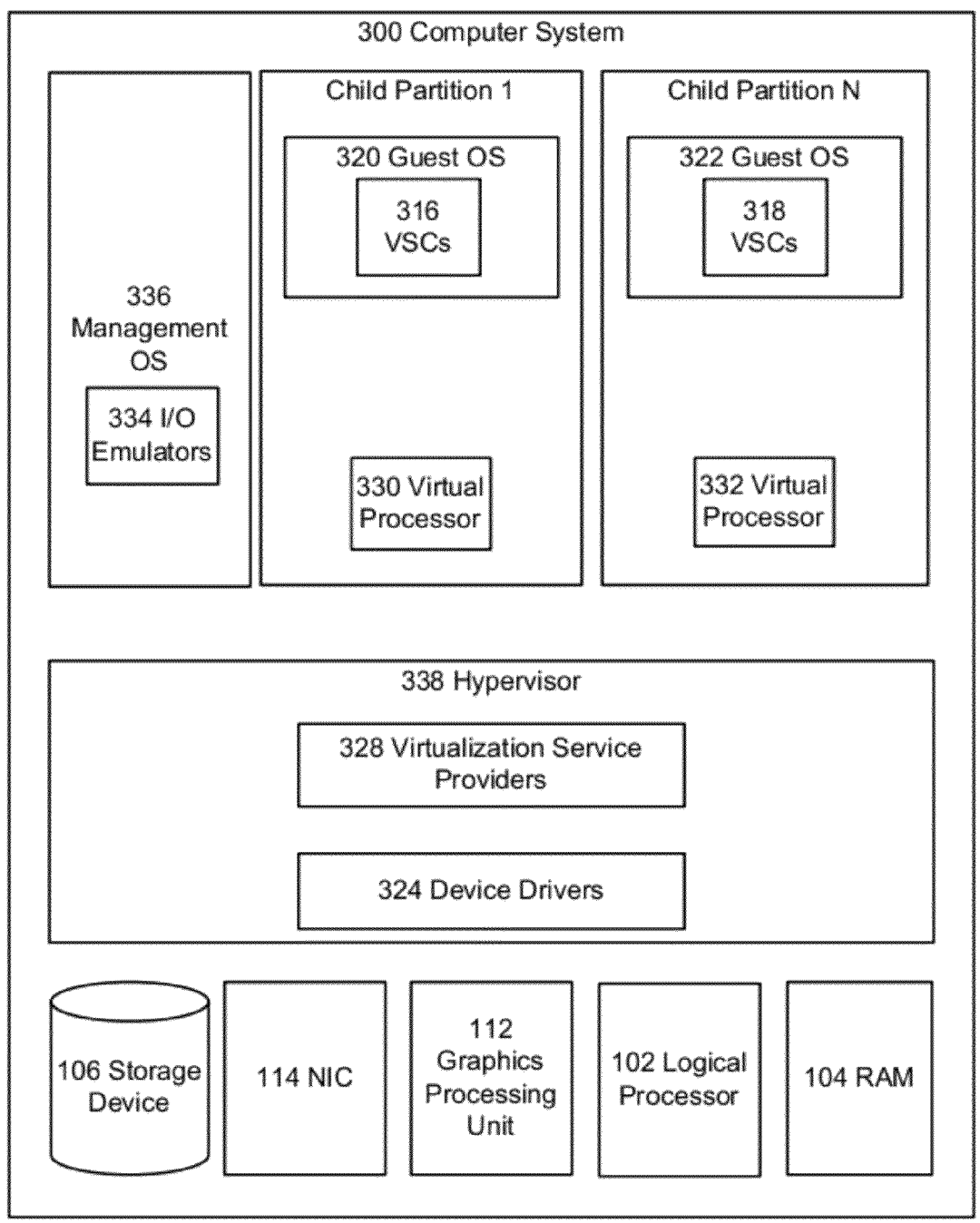
FIG. 4 depicts a second example virtual machine host wherein techniques described herein can be implemented.

FIG. 4 depicts a second example VMHost wherein techniques described herein can be implemented. FIG. 4 depicts similar components to those of FIG. 3; however in this example embodiment the hypervisor 338 can include the microkernel component and components from the parent partition 304 of FIG. 3 such as the virtualization service providers 328 and device drivers 324 while management operating system 336 may contain, for example, configuration utilities used to configure hypervisor 304. In this architecture hypervisor 338 can perform the same or similar functions as hypervisor microkernel 302 of FIG. 3; however, in this architecture hypervisor 334 can be configured to provide resources to guest operating systems executing in the child partitions. Hypervisor 338 of FIG. 4 can be a stand alone software product, a part of an operating system, embedded within firmware of the motherboard or a portion of hypervisor 338 can be effectuated by specialized integrated circuits.

FIG. 5 depicts an example deployment in which an aspect of an embodiment of the invention is implemented. The host 414 depicted in FIG. 5 may comprise example VM host 300 of FIG. 3 or 4, and host 414 may comprise a VM 408 that performs the functions of a remote presentation session server, such as the remote presentation session server 204 of FIG. 2, Deployment 400 comprises fabric controller 402, security token service 404, hosting layer 406, VMs 408-1 through 408-N, and VM images 410-1 through 410-N. As depicted, there are three instances of VM 408, though it may be appreciated that more or fewer instances of VM 408 may exist in systems that implement the present invention. Likewise, as depicted, there are three instances of VM image 410, though it may be appreciated that more or fewer instances of VM image 410 may exist in systems that implement the present invention. The instances of VM 408 are homogenously configured—they are configured to execute the same version of an operating system and to execute certain applications. There may be other VMs within deployment 400 that are not homogenously configured with VM 408. As depicted, each instance of VM 408 is configured to provide resources to client computers that access deployment 400. For instance, the instances of VM 408 may be configured to serve remote desktops or remote applications to clients. Each instance of VM 408 has an associated VM image 410 (for instance, VM 408-1 has associated VM image 410-a). A VM's associated VM image comprises a storage medium that bears instructions and/or data used in executing the VM. For instance, VM image 410-1 may comprise a guest operating system (guest OS) that VM 408-1 executes. A VM image 410 may be associated with a VM 408 by configuring the VM 408 to mount the associated VM image 410 upon execution of VM 408 and access instructions and/or data stored thereon.

The instances of VM 408 are hosted by a hosting layer 406 of a physical host 414. For instance, in a MICROSOFT Azure environment, hosting layer 406 may comprise an instance of Azure VM Host. Hosting layer 406 executes on a physical machine and is configured to enable multiple instances of VM 408 to run concurrently on the physical machine. Hosting layer 406 presents to a VM 408 a virtual operating platform and monitors the execution of VM 408 (and a guest operating system executing within VM 408).

Security token service 404 is configured to create and manage accounts for VMs and other entities (such as fabric controller 402) within deployment 400. That is, security token service 404 is able to extend a chain of trust that it is part of to other entities within deployment 400. Security token service 404 itself may be considered trusted because client 412 is configured with information that allows it to validate security tokens issued by security token server 404. For example, client 412 may be configured with the certificate the security token service 404 uses to sign tokens that it passes to VMs 408. Alternatively, client 412 may be configured to possess the subject name of the certificate used by security token service 404 for signing tokens that it issues.

A VM 408 may request a token from security token service 404. In that request, VM 408 proves its identity to security token service 404 by providing proof that it possesses the secret with which it was provisioned by fabric controller 402. Security token service 404 validates the identity of VM 408 using the account information (such as the VM's 408 public key) that was created by fabric controller 402. Security token service 404 then issues the token to the VM 408. The token is signed with the security token service's 404 private key. The VM 408 then sends the token to client 412, which validates that the token is signed by the security token service 404 using the information about the security token service's certificate with which client 412 is configured. Upon validation of the token, client 412 is able to check the identity asserted in the token for VM 408.

An example communication flow for effectuating the present invention is also depicted in FIG. 5. In communication flow (1), security token service 404 sends its public key to client 412. This may occur in response to security token service 404 receiving a request from client 412 for this public key. Communication flow (2) depicts fabric controller 402 instructing hosting layer 406 to create VM 408-1, and to pass a secret to VM 408-1 (such as by storing it in a location of VHD 410-1 where VM 408-1 is configured to look for the secret). Communication flow (3) depicts fabric controller 402 also sending that secret to security token service 404 and instructing security token service 404 to create an account for VM 408-1. In communication flow (4), VM 408-1 sends security token service 404 evidence that it has the secret. This may comprise the secret itself, but in scenarios where it may be possible for an attacker to snoop the communication link used for communication flow (4), it may rather comprise some indirect evidence that VM-1 408-1 has possession of the secret. For instance, where the secret comprises a number, VM-1 408-1 use the secret as input to a mathematical function, and then send the output of that mathematical function (the evidence that it has the secret) to security token service 404. Security token service 404, also having the secret, may also perform the same mathematical function using the secret as input, then compare its result against the result that it receives from VM-1 408-1. Where its result matches the result that it receives, security token service may determine that VM-1 408-1 does have the secret, is thus a valid member of the deployment, and send VM-1 408-1 a full token that it can use to prove its identity to a client. Security token service 404 may sign this full token with its private key before sending it, so that VM-1 408-1 may decrypt is with security token service's 404 public key, and confirm that the full token was generated by security token service 404, and that it was not modified during transmission. Communication flow (5) depicts client 412 receiving VM-1 408-1's full token. This may occur, for example, in response to client 412 sending a request to VM-1 408-1 for its full token. In another embodiment, VM-1 408-1 may broadcast or otherwise offer its token at a known location (such as at a gateway or connection broker of a deployment), and client 412 may obtain the token from this location.

As a result of communication flow (1) and communication flow (5), client 412 now has both the public key of security token service 304 and the full token of VM-1 408-1. It may then validate the full token (and, as a result, that VM-1 408-1 does have the identity that it purports to have) with the public key. For instance, where a mathematical function that takes the public key and the full token as inputs produces a known output that matches what client 412 knows the output should match if VM-1 408-1 does have the identity it purports to have, then client 412 may determine that VM-1 408-1 does have the identity it purports to have.

It may be appreciated that the present invention may be effectuated without adhering strictly to this communication flow of FIG. 5 (such as by implementing the communication flow of FIG. 6). For instance, in an embodiment of the present invention, client 412 may not receive the public key from security token service 404 (herein depicted as communication flow (1)) until after any of communication flows (2), (3), (4) or (5) have occurred. In another embodiment of the present invention, communication flow (3) (where fabric controller 402 sends the secret to security token service 404) may occur before communication flow (2) (where fabric controller sends the secret to VM 408-1). These examples do not make up a full enumeration of the possibilities for the communication flow.

FIG. 6 depicts another example deployment in which an aspect of an embodiment of the present invention is implemented, similar to FIG. 5. Fabric controller 402b, security token service 404b, hosting layer 406b, VMs 408-1b through 408-Nb, VHDs 410-1b through 410-Nb, client 412b, and host 414b may be similar to fabric controller 402, security token service 404, hosting layer 406, VMs 408-1 through 408-N, VHDs 410-1 through 410N, client 412, and host 414 of FIG. 5, respectively.

The primary difference between the embodiment of FIG. 6 and the embodiment of FIG. 5 is that, in the embodiment of FIG. 6, security token service 404b and VM 408-1b do not communicate directly as in FIG. 5, but rather use fabric controller 402b as an intermediary. In embodiments, this may be advantageous, because security token service 404b has fewer communications links to maintain. Embodiments where a security token service 404 and a VM 408 communicate directly to present VM 408 with a full token may be advantageous, such as where a token is valid only for a set period of time, so time spent indirectly sending the token through a fabric controller 404 may take up some of the time for which that full token is valid.

Like with respect to the communication flow of FIG. 5, the communication flow of the embodiment of FIG. 6 is not mandatory, and there are other embodiments that implement the present invention that may use different communication flows.

As depicted in FIG. 6, in communication flow 1B, client 412b obtains a public key from security token service 404b, and in communication flow 4B, client 412b obtains a full token from VM-lb 408-1b. These communication flows of 1B and 4B may be similar to communication flows 1 and 5, respectively, as described for FIG. 5.

Communication flow 2B depicts fabric controller 402b instructing security token service 404b to create an account for VM-1b 408-1b and receiving a full token from VM-1b 408-1b. In an embodiment where a secret is also created or determined, communication flow 2B includes either security token service 404b creating or determining the secret, and then sending it to fabric controller 402b, or fabric controller 402b creating or determining the secret, and then sending it to security token service 404b.

Communication flow 3B depicts fabric controller 402b sending the full token to VM-1b 408-1b. Where a secret is also used in an embodiment, communication flow 3B includes fabric controller 402b sending the secret to VM-1b 408-1b. After VM-1b 408-1b has the full token, it may send that full token to client 412b in communication flow 4B. Between communication flows 1B and 4B, client 412b has both the public key form security token service 404b (communication flow 1B) and the full token from VM-1b 408-1b (communication flow 4B). Client 412b may then validate the purported identity of VM-1b 408-1b using the public key and the token, as described with respect to FIG. 5.

Figure 7:
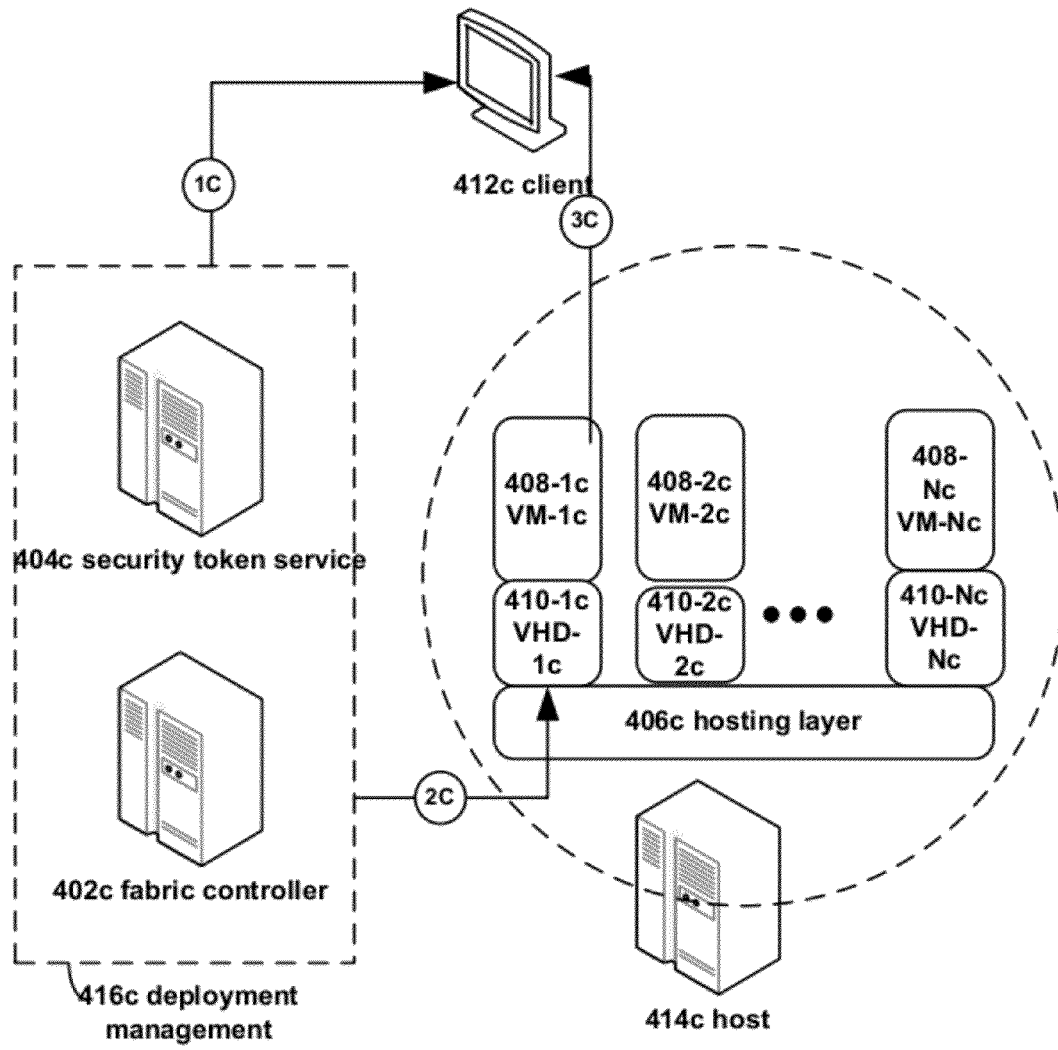
FIG. 7 depicts another example server farm in which an aspect of an embodiment of the invention is implemented.

FIG. 7 depicts another example deployment in which an aspect of an embodiment of the invention is implemented, similar to FIGS. 5 and 6. Fabric controller 402c, security token service 404c, hosting layer 406c, VMs 408-1c through 408-Nc, VHDs 410-1c through 410-Nc, client 412c, and host 414c may be similar to fabric controller 402, security token service 404, hosting layer 406, VMs 408-1 through 408-N, VHDs 410-1 through 410N, client 412, and host 414 of FIG. 5, respectively.

FIG. 7 also depicts deployment management 416c, which comprises fabric controller 402c and security token service 404c. Deployment management 416c handles a management role for a deployment that includes host 414c, including such things as provisioning VMs and providing tokens for authentication to VMs.

The primary difference between the embodiment of FIG. 7 and the embodiments of FIGS. 5 and 6 is that, in the embodiment of FIG. 7, deployment management 416c provisions VM-1c 408-1c, sends a public key to client 412c, and sends a full token to VM-1c 408-1c, whereas, for instance, in FIG. 5, those tasks were divided between fabric controller 402c and security token service 404c. Such an embodiment may occur where a single system or process handles these tasks by itself.

Like with respect to the communication flow of FIG. 5, the communication flow of the embodiment of FIG. 7 is not mandatory, and there are other embodiments that implement the present invention that may use different communication flows.

As depicted in FIG. 7, in communication flow 1C, client 412c obtains a public key from deployment management 416c. This may occur in a similar manner as to how client 412 obtains a public key from security token service 404 in communication flow 1 of FIG. 5. As further depicted in FIG. 7, in communication flow 3C, client 412c obtains a full token from VM-1c 408-1c. This may occur in a similar manner as to how client 412c obtains a full token from VM-1 408-1 in communication flow 5 of FIG. 4A.

As depicted in FIG. 7, in communication flow 2C, deployment management 416c provisions VM-1c 408-1c (such as by sending instructions to do so to host 414c), and also, as part of this act of provisioning, sends VM-1c 408-1c a full token that VM-1c 408-1c may use to prove its identity to clients such as client 412c.

After communication flows 1C, 2C, and 3C have occurred, client 412c has both a public key from deployment manager 416c (obtained in communication flow 1C), and a full token from VM-1c 408-1c (obtained in communication flow 3C). Client 412c may then validate the purported identity of VM-1c 408-1c using the public key and the token, as described with respect to FIG. 5.

Figure 8:
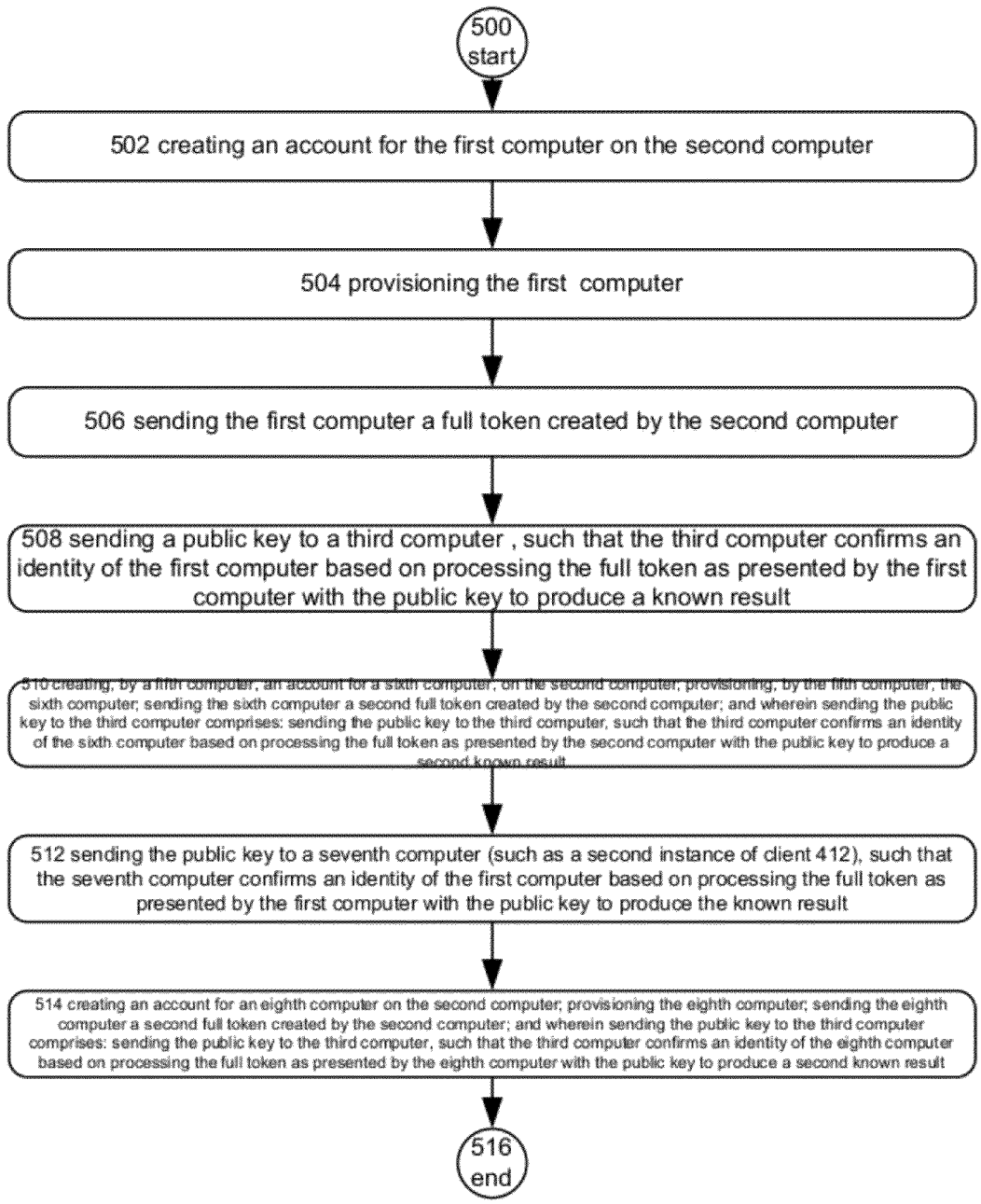
FIG. 8 depicts example operational procedures for a server farm establishing a provable identity for a VM of the server farm.

FIG. 8 depicts example operational procedures for a deployment establishing a provable identity for a VM of the deployment, that may be implemented, for instance, in the systems depicted in FIGS. 5-7. The operational procedures of FIG. 8 may be performed by a fabric controller, such as fabric controller 402. The operational procedures of FIG. 8 begin with operation 500, which leads into operation 502. Operation 502 depicts creating an account for the first computer (such as VM-1 408-1) on a second computer (such as security token service 404). Operation 502 may be effectuated in a manner similar to communication flow (3) of FIG. 5, or communication flow (2B) of FIG. 6.

In an embodiment where creating an account for the first computer on the second computer is performed by a fourth computer (such as fabric controller 402), and wherein the fourth computer has an account on the second computer and the authority to create accounts for other computers, operation 502 may include instructing the second computer, by the fourth computer, to create the account for the first computer. For instance, in FIG. 5, fabric controller 402 may have an account with security token service 404, and have the ability to create accounts for other computers.

Operation 504 depicts preparing the first computer to communicate on a communications network. Provisioning may comprise the fabric controller preparing the first computer/VM to operate, such as by creating the VM, and configuring it with the appropriate data and software to fulfill its function.

Operation 506 depicts sending the first computer a full token that comprises an assertion of an identity of the first computer, the full token being created by the second computer, computer based on the account for the first computer. The token may comprise a claim of an identity of the first computer. In an embodiment, operation 506 is performed by the second computer (security token service 404). This may be similar to communication flow (4) of FIG. 5.

In an embodiment, operation 506 comprises sending to the first computer, by the second computer, the full token, in response to receiving a credential from the first computer corresponding to a credential stored in an account for the first computer on the second computer. For instance, when fabric controller 402 provisions VM-1 408-1 and also creates an account for VM-1 408-1 with security token service 404, it may send a credential (sometimes referred to as a secret) to both VM-1 408-1 and security token service 404. Then, when VM-1 408-1 wants to prove to security token service 404 that it is authorized to receive a full token for the account, it may present the credential to security token service 404 (such as by encoding it with security token service's 404 public key).

Operation 508 depicts sending a public key to a third computer (such as client 412), wherein the third computer confirms the identity of the first computer based on determining that combining the full token of the first computer with the public key produces a result consistent with the identity of the first computer. This may comprise communication flows (1) and (5) of FIG. 5, communication flows (1B) and (4B) of FIG. 6, or communication flows (1C) and (3C) of FIG. 7. When client 412 obtains both security token service's 404 public key, and the full token from VM-1 408-1, it may validate an identity of VM-1 408-1 by processing the secure token with the public key to produce a known result that is consistent with the identity of the first computer.

In an embodiment, operation 508 comprises the third computer determining to trust the full token because it was issued by the second computer, the third computer having validated an identity of the second computer. The third computer may have validated the identity of the second computer through determining that a domain name service name (such as a name provided through DNS) for the second computer matches a name in a certificate for the second computer (such as a Secure Sockets Layer—SSL—certificate). That client 412 trusts the full token at all may be based on a trusted-chain that extends from an entity that it trusts down to VM-1 408-1. The top of this chain may be the Domain Name System (DNS)—that when client 412 queries DNS for the computer with name tokenservice.contoso.com and is directed to security token service 404, that that information is accurate. Client 412 may then authenticate a certificate presented by security token service 404 (that is issued by a certificate authority, or self-issued) as having the same name for the security token service as is obtained through DNS. Client 412 may then trust that security token service 412 has the identity it asserts to have. This chain of trust then extends to VM-1 408-1 where VM-1 408-1 is able to present to client 412 a full token that may be validated with the already-trusted security token service's 404 public key.

Operation 510 depicts, in an embodiment where wherein creating an account for the first computer on the second computer is performed by a fourth computer, and further comprising: creating, by a fifth computer (such as a second instance of fabric controller 402), an account for a sixth computer (such as VM-2 408-2), on the second computer; provisioning, by the fifth computer, the sixth computer; sending the sixth computer a second full token created by the second computer; and wherein sending the public key to the third computer comprises: sending the public key to the third computer, such that the third computer confirms an identity of the sixth computer based on processing the full token as presented by the second computer with the public key to produce a second known result. There may be cases where multiple fabric controllers 402 co-exist in a deployment, and each fabric controller is configured to communicate with security token service 404 to obtain full tokens on behalf of VMs 408 that they provision. In operation 510, a second fabric controller 402, provisions a second VM (such as VM-2 408-2) and obtains from security token service 404 a second full token for this second VM 408.

Operation 512 depicts sending the public key to a seventh computer (such as a second instance of client 412), such that the seventh computer confirms an identity of the first computer based on processing the full token as presented by the first computer with the public key to produce the known result. Multiple clients may validate the identity of a VM (such as VM-1 408-1), using the same full token presented by the VM 408, as well as the same public key presented by security token service 404.

Operation 514 depicts creating an account for an eighth computer (such as VM-N 408-N) on the second computer; provisioning the eighth computer; sending the eighth computer a second full token created by the second computer; and wherein sending the public key to the third computer comprises: sending the public key to the third computer, such that the third computer confirms an identity of the eighth computer based on processing the full token as presented by the eighth computer with the public key to produce a second known result. Where multiple VMs are provisioned with their own full token, each of these tokens may be validated by a client using the same public key of the security token service 404. As depicted in operation 514, a single client 412 uses one public key from security token service 404 to validate two full tokens—one for VM-1 408-1 and one for VM-N 408-N.

The operational procedures end with operation 516. It may be appreciated that there are embodiments of the invention that do not implement all of the operations of FIG. 8, or implement them (or a subset of them) in a different order than is depicted. For instance, an embodiment of the invention may implement operations 500, 502, 504, 506, 508, and 516, or an embodiment of the invention may implement operation 504 before operation 502.

Figure 9:
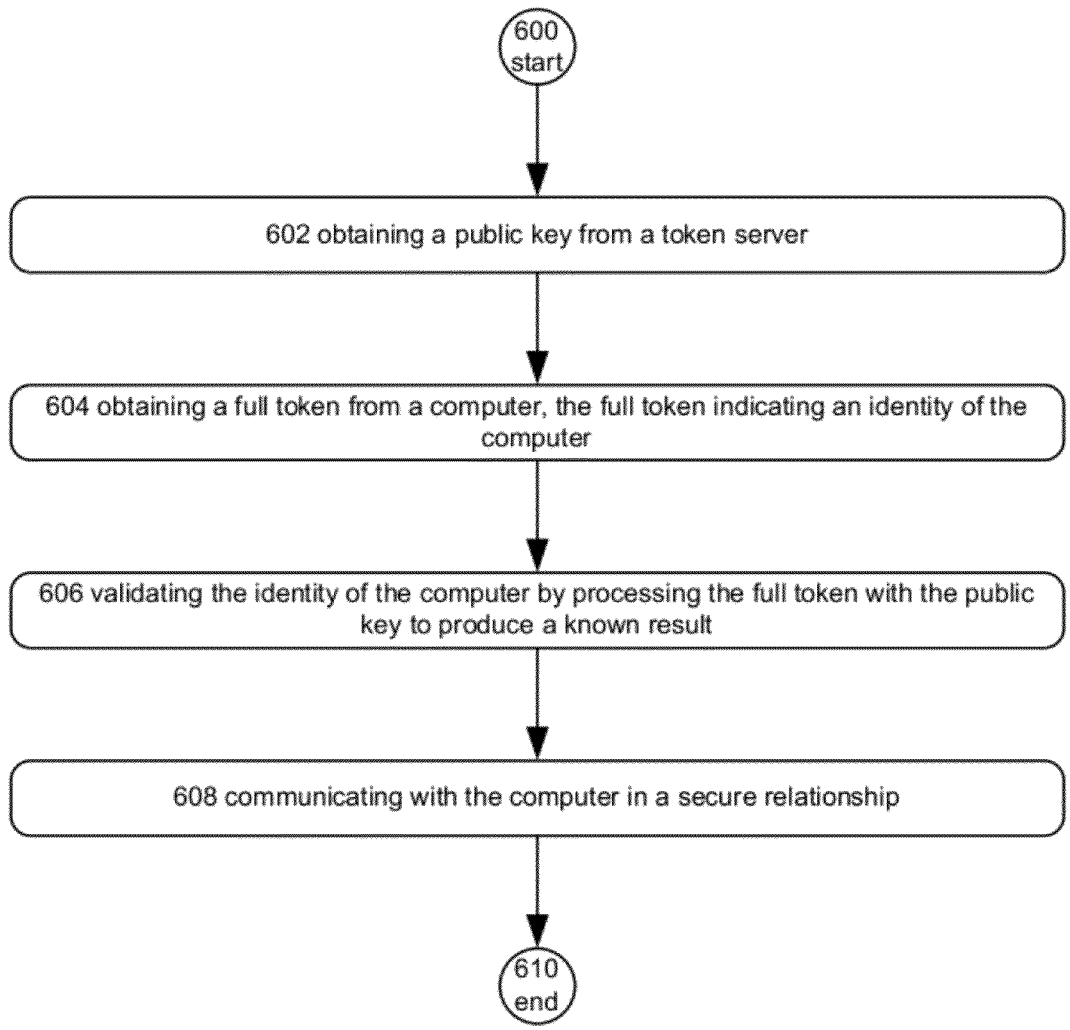
FIG. 9 depicts example operational procedures for a client of a server farm verifying the provable identity of a VM of a server farm.

With respect to both FIGS. 8 and 9, it may be appreciated that not all elements of FIGS. 5-7 have been enumerated in the examples. For instance, where client 412 of FIG. 5 is referred to as performing a task, it may be appreciated that this task may also be performed by client 412b of FIG. 6, or client 412c of FIG. 7.

FIG. 9 depicts example operational procedures for a client of a deployment verifying the provable identity of a VM of a deployment, that may be implemented, for instance, in the systems depicted in FIGS. 5-7. The operational procedures of FIG. 9 may be implemented for instance, by client 412 of FIG. 5, where fabric controller 402 of FIG. 5 implements the operational procedures of fabric controller 402. The operational procedures of FIG. 9 begin with operation 600, which leads into operation 602. Operation 602 depicts obtaining a public key from a token service. Operation 604 may occur in a manner similar to communication flow (1) of FIG. 5, communication flow (1B) of FIG. 6, or communication flow (1C) of FIG. 7.

Operation 604 depicts obtaining a full token from a computer, the full token indicating an identity of the computer. Operation 604 may occur in a manner similar to communication flow (5) of FIG. 5, communication flow (4B) of FIG. 6, or communication flow (3C) of FIG. 7.

Operation 606 depicts validating the identity of the computer by processing the full token with the public key to produce a known result. Having obtained the public key of security token service 404 in operation 602, and the full token of VM-1 408-1 in operation 604, client 412 now has both the public key and the full token, and may validate the full token (and thus, the identity of VM-1 408-1) using the public key from security token service 404, which client 412 trusts.

Operation 608 depicts communicating with the computer in a secure relationship. In operation 606, client 412 has validated the identity of VM-1 408-1 to be that which VM-1 408-1 asserts it is. Based on a chain of trust that extends down through security token service 404 and to VM-1 408-1, client 412 may trust VM-1 408-1, and as they communicate (such as where VM-1 408-1 serves client 412 a remote presentation session), this communication may occur within a secure, or a trusted, relationship.

The operational procedures of FIG. 9 end with operation 610.

While the present invention has been described in connection with the preferred aspects, as illustrated in the various figures, it is understood that other similar aspects may be used or modifications and additions may be made to the described aspects for performing the same function of the present invention without deviating there from. Therefore, the present invention should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for establishing a provable identity for a virtual machine, comprising:

launching the virtual machine;

creating an account for the virtual machine on a second computer;

in response to creating the account for the virtual machine on the second computer, sending the virtual machine first data, and sending the second computer the first data;

sending, by the virtual machine, the first data to the second computer and the second computer verifying the first data as received from the virtual machine against the first data already possessed by the second computer;

in response to the second computer verifying the first data as received from the virtual machine against the first data already possessed by the second computer, creating a full token that comprises an assertion of an identity of the virtual machine, and sending the full token to the virtual machine;

sending a public key to a third computer; and sending, by the virtual machine, the full token to the third computer, the third computer confirming the identity of the virtual machine based on determining that combining the full token of the virtual machine and the public key produces a result consistent with the identity of the virtual machine.

2. The method of claim 1, wherein creating the account for the virtual machine on the second computer is performed by a fourth computer, and wherein the fourth computer has an account on the second computer and authority to create an account for the virtual machine, and further comprising:

instructing the second computer, by the fourth computer, to create the account for the virtual machine.

3. The method of claim 2, wherein sending the virtual machine the full token is performed by the second computer.

4. The method of claim 1, wherein sending the public key to the third computer, wherein the third computer confirms the identity of the virtual machine based on determining that combining the full token of the virtual machine and the public key produces a result consistent with the identity of the virtual machine, further comprises:

the third computer determining to trust the full token because it was issued by the second computer, the third computer having validated an identity of the second computer through querying a domain name system with a network address of the second computer to receive a uniform resource locator (URL) of the second computer, and comparing the URL of the second computer with a URL stored in a certificate for the second computer.

5. The method of claim 1, wherein the third computer has validated an identity of the second computer by determining that a domain name system name for the second computer matches a name in a certificate for the second computer.

6. The method of claim 1, wherein sending the virtual machine the full token created by the second computer comprises:

sending to the virtual machine, by the second computer, the full token, in response to receiving a credential from the virtual machine corresponding to a credential stored in an account for the virtual machine on the second computer.

7. The method of claim 1, wherein creating the account for the virtual machine on the second computer is performed by a fourth computer, and further comprising:

creating, by a fifth computer, an account for a sixth computer, on the second computer;

sending the sixth computer a second full token that comprises an assertion of an identity of the sixth computer, the second full token being created by the second computer based on the account for the second computer; and wherein sending the public key to the third computer comprises:

sending the public key to the third computer, wherein the third computer confirms the identity of the sixth computer based on determining that combining the full token of the sixth computer and the public key produces a result consistent with the identity of the sixth computer.

8. The method of claim 1, further comprising:

sending the public key to a seventh computer, such that the seventh computer confirms the identity of the virtual machine based on processing the full token as presented by the virtual machine with the public key to produce a known result.

9. The method of claim 1, further comprising:

creating an account for an eighth computer on the second computer;

sending the eighth computer a second full token that comprises an assertion of an identity of the eighth computer, the second full token being token created by the second computer based on the account for the eighth computer; and wherein sending the public key to the third computer comprises:

sending the public key to the third computer, wherein the third computer confirms the identity of the eighth computer based on determining that combining the second full token of the eighth computer and the public key produces a result consistent with the identity of the eighth computer.

10. A system for establishing a provable identity for a virtual machine, comprising:

a memory bearing instructions that, upon execution by a processor, cause the system to at least:

launch the virtual machine;

create an account for the virtual machine on a second computer;

in response to creating the account for the virtual machine on the second computer, send the virtual machine first data, and sending the second computer the first data;

send, by the virtual machine, the first data to the second computer and the second computer verifying the first data as received from the virtual machine against the first data already possessed by the second computer;

in response to the second computer verifying the first data as received from the virtual machine against the first data already possessed by the second computer, create a full token that comprises an assertion of an identity of the virtual machine, and sending the full token to the virtual machine;

send a public key to a third computer; and send, by the virtual machine, the full token to the third computer, the third computer confirming the identity of the virtual machine based on determining that combining the full token of the virtual machine and the public key produces a result consistent with the identity of the virtual machine.

11. The system of claim 10, wherein the instructions that, upon execution by the processor, cause the system at least to create the account for the virtual machine on the second computer is performed by a fourth computer, and wherein the fourth computer has an account on the second computer and authority to create an account for the virtual machine, further cause the system at least to:

instruct the second computer, by the fourth computer, to create the account for the virtual machine.

12. The system of claim 11, wherein sending the virtual machine the full token is performed by the second computer.

13. The system of claim 10, wherein the instructions that, upon execution by the processor, cause the system at least to send the public key to the third computer, wherein the third computer confirms the identity of the virtual machine based on determining that combining the full token of the virtual machine and the public key produces a result consistent with the identity of the virtual machine, further cause the system at least to:

determine, by the third computer, to trust the full token because it was issued by the second computer, the third computer having validated an identity of the second computer through querying a domain name system with a network address of the second computer to receive a uniform resource locator (URL) of the second computer, and comparing the URL of the second computer with a URL stored in a certificate for the second computer.

14. The system of claim 10, wherein the third computer has validated an identity of the second computer by determining that a domain name system name for the second computer matches a name in a certificate for the second computer.

15. The system of claim 14, wherein the certificate was issued by a certificate authority trusted by the third computer.

16. The system of claim 10, wherein the instructions that, upon execution by the processor, cause the system at least to send the virtual machine the full token created by the second computer further cause the system at least to:

send to the virtual machine, by the second computer, the full token, in response to receiving a credential from the virtual machine corresponding to a credential stored in an account for the virtual machine on the second computer.

17. The system of claim 10, wherein the instructions that, upon execution by the processor, cause the system at least to create the account for the virtual machine on the second computer, is performed by a fourth computer, and wherein the memory further bears instructions that, upon execution by the processor, cause the system at least to:

create, by a fifth computer, an account for a sixth computer, on the second computer;

send the sixth computer a second full token that comprises an assertion of an identity of the sixth computer, the second full token being created by the second computer based on the account for the second computer; and wherein the instructions that, upon execution by the processor, cause the system at least to send the public key to the third computer further cause the system at least to:

send the public key to the third computer, wherein the third computer confirms the identity of the sixth computer based on determining that combining the full token of the sixth computer and the public key produces a result consistent with the identity of the sixth computer.

18. The system of claim 10, wherein the memory further bears instructions that, upon execution by the processor, cause the system at least to:

send the public key to a seventh computer, such that the seventh computer confirms the identity of the virtual machine based on processing the full token as presented by the virtual machine with the public key to produce a known result.

19. The system of claim 10, wherein the memory further bears instructions that, upon execution by the processor, cause the system at least to:

create an account for an eighth computer on the second computer;

send the eighth computer a second full token that comprises an assertion of an identity of the eighth computer, the second full token being token created by the second computer based on the account for the eighth computer; and wherein the instructions that, upon execution by the processor, cause the system at least to send the public key to the third computer further cause the system at least to:

send the public key to the third computer, wherein the third computer confirms the identity of the eighth computer based on determining that combining the second full token of the eighth computer and the public key produces a result consistent with the identity of the eighth computer.

20. A computer-readable storage device for establishing a provable identity for a virtual machine, bearing computer-readable instructions that, upon execution by a computer, cause the computer to perform operations comprising:

launching the virtual machine;

creating an account for the virtual machine on a second computer;

in response to creating the account for the virtual machine on the second computer, sending the virtual machine first data, and sending the second computer the first data;

sending, by the virtual machine, the first data to the second computer and the second computer verifying the first data as received from the virtual machine against the first data already possessed by the second computer;

in response to the second computer verifying the first data as received from the virtual machine against the first data already possessed by the second computer, creating a full token that comprises an assertion of an identity of the virtual machine, and sending the full token to the virtual machine;

sending a public key to a third computer; and sending, by the virtual machine, the full token to the third computer, the third computer confirming the identity of the virtual machine based on determining that combining the full token of the virtual machine and the public key produces a result consistent with the identity of the virtual machine.

\* \* \* \* \*